(No Model.)
J. M. W. LONG.
CULTIVATOR.
No. 546,020. Patented Sept. 10, 1895.
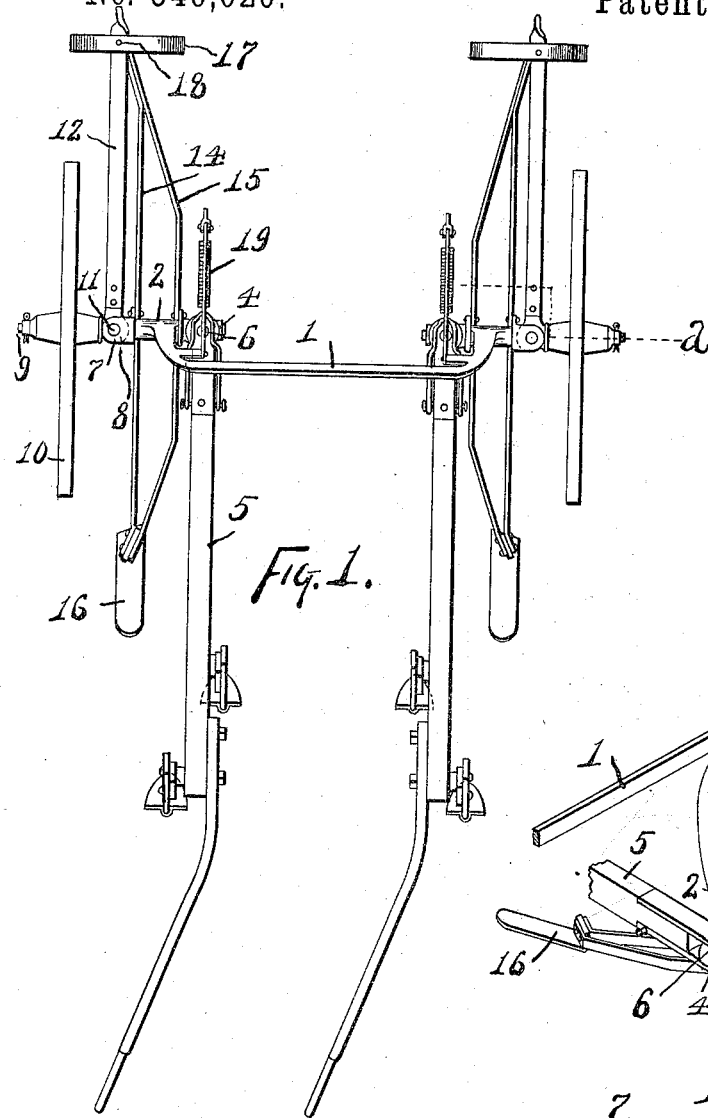
Fig. 1.
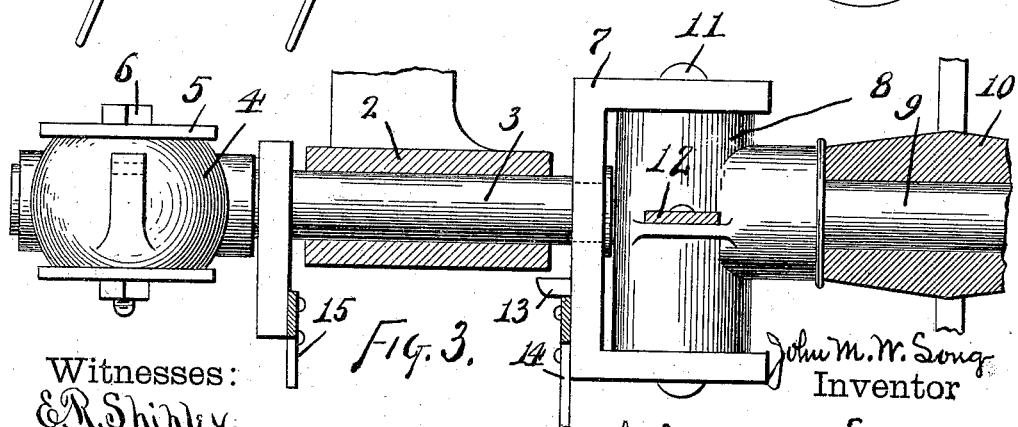
Fig. 2.
Fig. 3.
Witnesses:
E. R. Shipley
M. S. Belden
John M. W. Long
Inventor
by James W. See
Attorney

UNITED STATES PATENT OFFICE.

JOHN M. W. LONG, OF HAMILTON, OHIO, ASSIGNOR TO THE LONG & ALLSTATTER COMPANY, OF SAME PLACE.

CULTIVATOR.

SPECIFICATION forming part of Letters Patent No. 546,020, dated September 10, 1895.

Application filed July 11, 1895. Serial No. 555,650. (No model.)

*To all whom it may concern:*

Be it known that I, JOHN M. W. LONG, of Hamilton, Butler county, Ohio, have invented certain new and useful Improvements in Cultivators, of which the following is a specification, reference being had to the accompanying drawings, in which—

Figure 1 is a plan of a cultivator embodying my improvements; Fig. 2, a perspective of the portions at one side of the arch, and Fig. 3 an enlarged vertical section in the plane of line *a* of Fig. 1.

In the foot-bearings 2 of the usual arch 1 are journaled horizontal spindles 3, having at their inner ends heads 4, to which are connected the forward ends of the gangs 5 by means of coupling-pins 6, as usual in tongueless cultivators.

19 indicates the lifting and depressing springs connected, as usual, to the arch and gangs. On the outer ends of the spindles 3 are forks 7 in which are held heads 8 by vertical pivot-pins 11, the heads carrying stub-axles 9 on which turn the wheels 10. Hitch-levers 12 have their rear ends rigidly attached to the heads 8, so that the wheels 10 are swung upon pivots 11 in accordance with changes in the direction of the line of draft, thus forming what is known as a "crazy-wheel" cultivator. At the forward end of hitch-levers 12 are horizontal guide-loops 17 carried by bars 14 rigidly secured to forks 7 and braced by bars 15 hung upon spindles 3. Bars 14 15 extend rearwardly and downwardly and carry the shoes 16, which rest on the ground. Flat surfaces under bearings 2 engage ribs 13 on forks 7, and thus the shoes 16 prevent the arch 1 from falling. When the strain of draft comes on levers 12, the forward ends of those levers are depressed somewhat, thus raising the shoes 16 from the ground, ribs 13 still serving to sustain the arch. When the crazy-wheel provision is not desired, then pins may be inserted in holes 18 through the guide-loops and hitch-levers, thus preventing movement on pivots 11.

I claim as my invention—

In a cultivator the combination, substantially as set forth, of an arch, spindles journaled therein, gangs coupled to the spindles, wheel-axles coupled to the spindles, and having forwardly projecting hitch-levers, bars connected intermediately to the spindles, guide-loops carried by the forward ends of the bars, and shoes carried by the rear ends of the bars.

JOHN M. W. LONG.

Witnesses:
   J. W. SEE,
   JAS. FITTON.